(12) United States Patent
Marchal et al.

(10) Patent No.: US 10,293,530 B2
(45) Date of Patent: May 21, 2019

(54) METHOD OF FABRICATING A BLADE PLATFORM OUT OF COMPOSITE MATERIAL WITH INTEGRATED GASKETS FOR A TURBINE ENGINE FAN

(71) Applicant: SAFRAN AIRCRAFT ENGINES, Paris (FR)

(72) Inventors: Yann Didier Simon Marchal, Moissy-Cramayel (FR); Bruno Jacques Gerard Dambrine, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 162 days.

(21) Appl. No.: 15/126,982

(22) PCT Filed: Mar. 5, 2015

(86) PCT No.: PCT/FR2015/050543
§ 371 (c)(1),
(2) Date: Sep. 16, 2016

(87) PCT Pub. No.: WO2015/140442
PCT Pub. Date: Sep. 24, 2015

(65) Prior Publication Data
US 2018/0117807 A1    May 3, 2018

(30) Foreign Application Priority Data

Mar. 17, 2014  (FR) ..................................... 14 52167

(51) Int. Cl.
*B29C 45/14*        (2006.01)
*B29C 70/48*        (2006.01)
(Continued)

(52) U.S. Cl.
CPC ........ *B29C 45/14065* (2013.01); *B29B 11/04* (2013.01); *B29B 11/14* (2013.01);
(Continued)

(58) Field of Classification Search
CPC ................. B29B 11/14; B29C 45/1418; B29C 2045/14237
See application file for complete search history.

(56) References Cited

U.S. PATENT DOCUMENTS

2011/0048620 A1*  3/2011  Foucault ................. B29C 70/68
                                                          156/189
2011/0243744 A1* 10/2011  Forgue .................. F01D 5/3007
                                                          416/204 A
(Continued)

FOREIGN PATENT DOCUMENTS

WO    WO 2010/066833 A1    6/2010
WO    WO 2010/103213 A1    9/2010
(Continued)

OTHER PUBLICATIONS

International Search Report dated Jun. 8, 2015 in PCT/FR2015/050543 Filed Mar. 5, 2015.

*Primary Examiner* — James Sanders
(74) *Attorney, Agent, or Firm* — Oblon, McClelland, Maier & Neustadt, L.L.P.

(57) ABSTRACT

There is provided a method of fabricating a blade platform out of composite material with integrated gaskets for a turbine engine fan, the platform including a base and a stiffener, the method including using three-dimensional weaving to make a single-piece fiber blank with a plurality of longitudinal yarn layers extending in a direction corresponding to a longitudinal direction of the base of the platform; shaping the fiber blank to form a fiber preform having a first portion forming a base preform and a second portion forming a stiffener preform; positioning platform
(Continued)

gaskets at side margins of the first portion of the fiber preform forming a base preform; placing the fiber preform with the gaskets in an injection mold; injecting resin into the injection mold; compacting the assembly; heating the injection mold to solidify the resin; and unmolding the resulting platform.

11 Claims, 3 Drawing Sheets

(51) Int. Cl.
| | | |
|---|---|---|
| *B29B 11/16* | (2006.01) | |
| *B29C 70/22* | (2006.01) | |
| *B29B 11/04* | (2006.01) | |
| *B29B 11/14* | (2006.01) | |
| *B29C 45/73* | (2006.01) | |
| *D03D 25/00* | (2006.01) | |
| B29L 31/00 | (2006.01) | |
| B29C 70/24 | (2006.01) | |
| B29K 105/20 | (2006.01) | |
| B29K 707/04 | (2006.01) | |
| B29L 31/08 | (2006.01) | |

(52) U.S. Cl.
CPC .......... *B29B 11/16* (2013.01); *B29C 45/1418* (2013.01); *B29C 45/73* (2013.01); *B29C 70/222* (2013.01); *B29C 70/48* (2013.01); *D03D 25/005* (2013.01); *B29C 70/24* (2013.01); *B29C 2045/14237* (2013.01); *B29K 2105/20* (2013.01); *B29K 2707/04* (2013.01); *B29K 2713/00* (2013.01); *B29L 2031/082* (2013.01); *B29L 2031/7504* (2013.01)

(56) References Cited

U.S. PATENT DOCUMENTS

| | | |
|---|---|---|
| 2012/0027572 A1 | 2/2012 | Denece et al. |
| 2014/0072443 A1 | 3/2014 | Mateo et al. |
| 2014/0322485 A1 | 10/2014 | Marchal et al. |
| 2014/0363299 A1 | 12/2014 | Marchal et al. |

FOREIGN PATENT DOCUMENTS

| | | |
|---|---|---|
| WO | WO 2012/156625 A1 | 11/2012 |
| WO | WO 2013/088041 A2 | 6/2013 |
| WO | WO 2013/104853 A2 | 7/2013 |
| WO | WO 2013/160584 A1 | 10/2013 |

\* cited by examiner

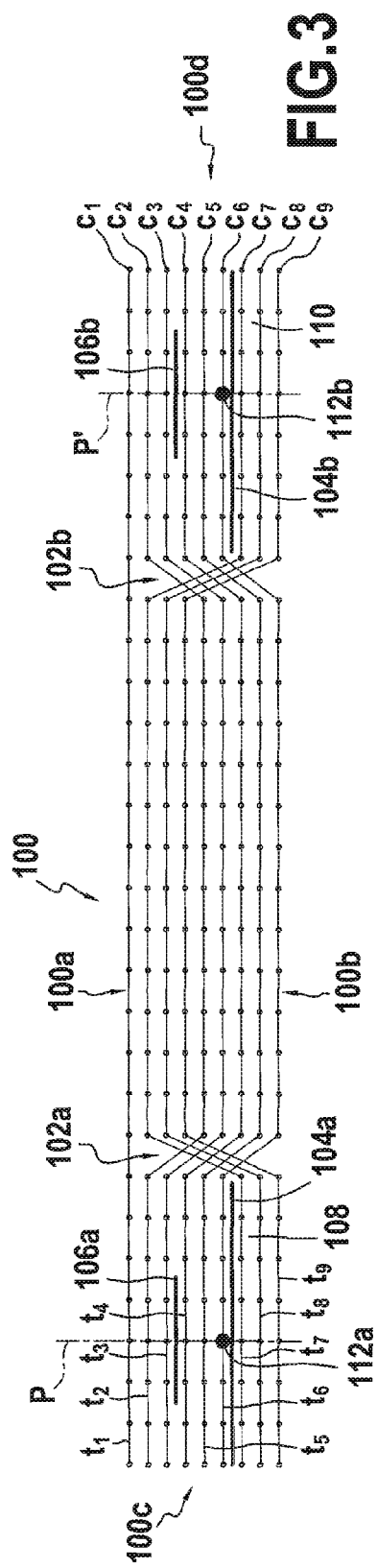
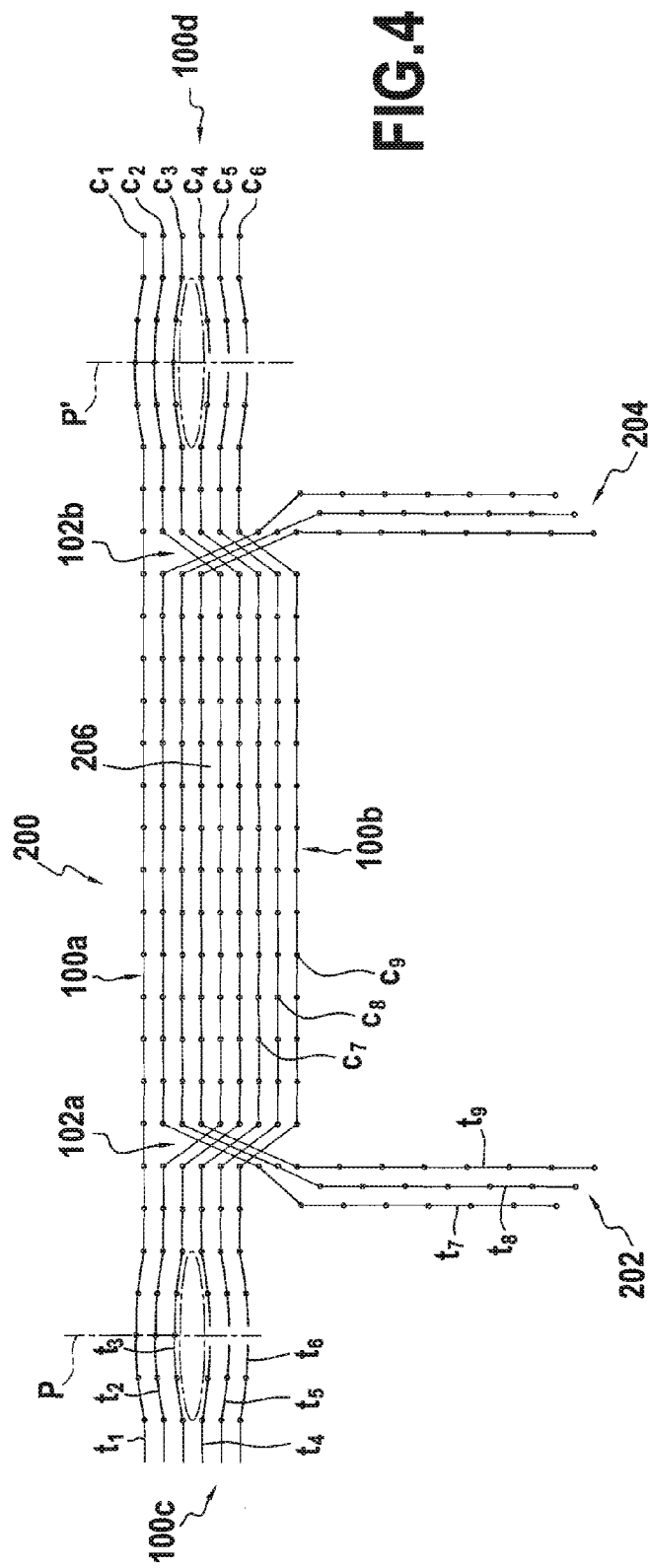

METHOD OF FABRICATING A BLADE PLATFORM OUT OF COMPOSITE MATERIAL WITH INTEGRATED GASKETS FOR A TURBINE ENGINE FAN

BACKGROUND OF THE INVENTION

The present invention relates to the general field of fabricating blade platforms out of composite material with integrated gaskets for a turbine engine fan.

Fan blade platforms for turbine engines, in particular turbojets, are arranged between fan blades so as to extend the inlet cone of a fan. They serve in particular to define the inside of the annular passage for admitting air into the fan, this passage being defined on the outside by a casing.

Such fan blade platforms may be separate fittings or they may be integrated directly with the bases of the fan blades, between the tangs extending their and their airfoils.

Proposals have already been made for making such platforms out of composite material. By way of example, reference may be made to Document WO 2013/088041, which describes making a fiber preform of π-shaped section in particular for a composite material fan blade platform by using a fiber structure obtained as a single piece by three-dimensional weaving and having both a portion that forms an airfoil preform and also another portion that forms stiffener legs.

Document WO 2013/104852 also discloses a method of fabricating a composite material fan blade having platforms integrated therein. In that document, the fan blade is made from a fiber preform obtained as a single piece by three-dimensional weaving and having both a portion that forms an airfoil preform and also another portion that forms a platform preform.

Furthermore, it is known to fit fan blade platforms with gaskets for providing sealing between the platforms and the blades between which they are arranged. The purpose of such gaskets is to limit losses of aerodynamic performance associated with recirculating air.

Typically, such gaskets are adhesively bonded to each of the side margins of the platform via a film of adhesive extending over the entire length of the platform. However, adhesively bonding such gaskets is an operation that is both complicated and requires a large amount of time. Furthermore, the gaskets rapidly tend to become unstuck.

OBJECT AND SUMMARY OF THE INVENTION

There therefore exists a need to be able to provide a composite material fan blade platform that does not present the above-mentioned drawbacks concerning sealing gaskets.

In accordance with the invention, this object is achieved by the method of fabricating a blade platform out of composite material with integrated gaskets for a turbine engine fan, the platform comprising a base extending along a longitudinal direction and presenting two opposite faces and a stiffener that extends from one of the faces of the base, the method comprising:

using three-dimensional weaving to make a single-piece fiber blank with a plurality of longitudinal yarn layers extending in a direction corresponding to a longitudinal direction of the base of the platform and interlinked by yarns of a plurality of transverse yarn layers, while leaving between the longitudinal yarn layers two main zones of non-interlinking that are open, each extending from a side edge of the fiber blank for the purpose of forming a stiffener preform;

shaping the fiber blank to form a fiber preform having a first portion forming a base preform and a second portion forming stiffener leg preforms;

positioning platform gaskets at the side margins of the first portion of the fiber preform forming a base preform;

placing the fiber preform with the gaskets in an injection mold;

injecting resin into the injection mold;

compacting the assembly;

heating the injection mold to solidify the resin; and unmolding the resulting platform.

The fabrication method of the invention is remarkable in that the gaskets are integrated directly in the fiber preform before the step of injecting resin. At the time of this fabrication step, the preform is still sufficiently flexible for it to be possible to engage the gaskets therein. After injection, the gaskets are thus directly fastened to the platform. In particular, having recourse to adhesive and the corresponding drawbacks is avoided.

In an implementation, the step of using three-dimensional weaving to make the fiber blank further comprises making closed secondary zones of non-interlinking in the side margins of a portion of the fiber blank that is to form the base preform, the secondary zones of non-interlinking being opened and the gaskets being inserted therein prior to the step of placing the fiber preform in the injection mold.

In this implementation, the opening of each secondary zone of non-interlinking may comprise cutting the portion of the fiber blank that is to form a base preform in a cutting plane leading to the inside of each said secondary zone of non-interlinking. Under such circumstances, the cutting plane is preferably previously identified on the fiber blank.

Still in this implementation, each gasket may have an attachment portion that is inserted longitudinally inside a secondary zone of non-interlinking, once opened.

In another implementation, the gaskets are assembled to the side margins of the first portion of the fiber preform forming a base preform by stitching prior to the step of placing the fiber preform in the injection mold.

In this implementation, carbon yarns may be used for assembling the gaskets to the side margins of the first portion of the fiber preform forming a base preform.

In yet another implementation, the gaskets are placed in the injection mold against the side margins of the first portion of the fiber preform forming a base preform without being mechanically connected thereto.

The stiffener of the preform may comprise two legs. It may also include a stiffener wall connecting together free ends of the legs.

The invention also provides a composite material blade platform for a turbine engine fan with integrated gaskets obtained by a method as defined above.

BRIEF DESCRIPTION OF THE DRAWINGS

Other characteristics and advantages of the present invention appear from the following description made with reference to the accompanying drawings, which show implementations having no limiting character. In the figures:

FIGS. 3 and 4 show various steps of the method of obtaining the blade platform of FIGS. 1 and 2.

DETAILED DESCRIPTION OF THE INVENTION

Figure 1:
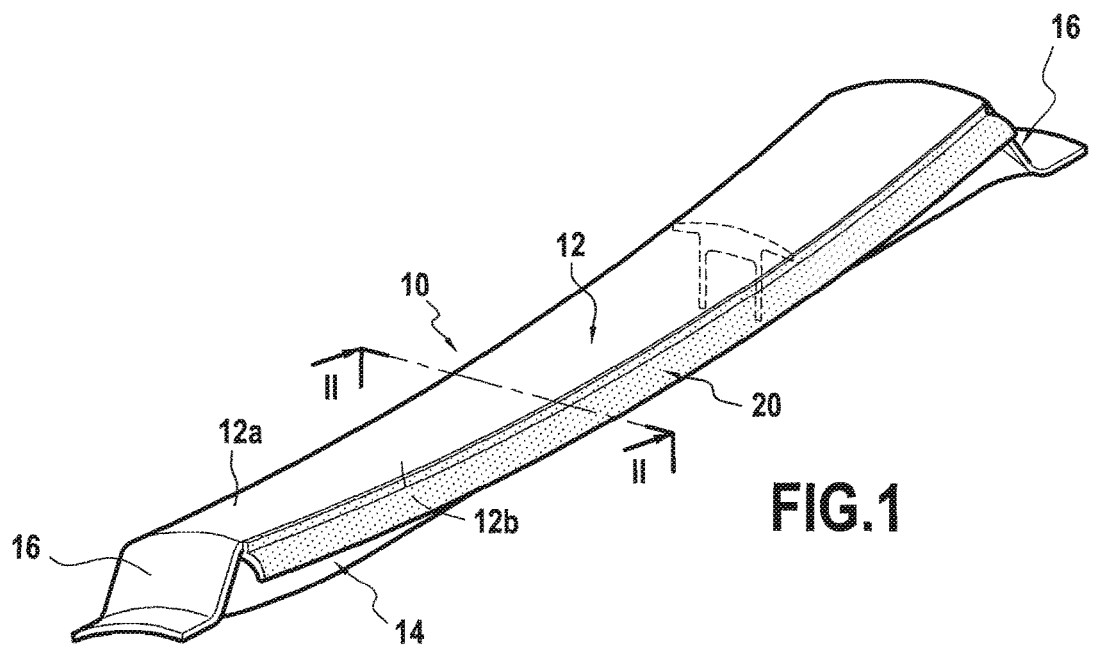
FIG. 1 is a diagrammatic view showing a fan blade platform made of composite material obtained by a first implementation of the method of the invention.
Figure 2:
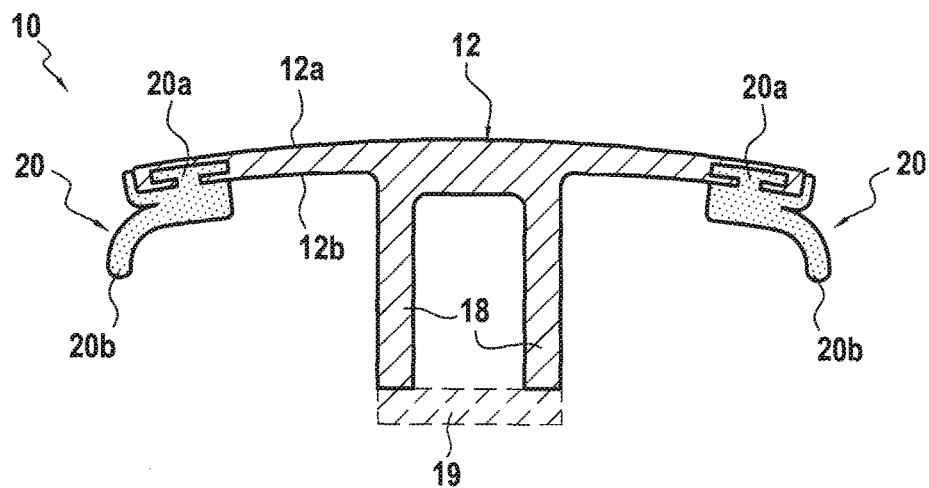
FIG. 2 is a section view on of FIG. 1.

FIGS. 1 and 2 show a turbine engine fan platform 10 to which the invention applies in particular.

The platform 10 comprises a first portion forming a base 12 and a second portion forming a stiffener 14. The base extends in a longitudinal direction of the platform and has opposite top and bottom faces 12a and 12b. At each of its longitudinal ends, the base has a step 16, i.e. its ends are folded inwards along substantially transverse lines. These steps 16 serve to enable the platform to be fastened to the structure of the turbine engine.

The stiffener 14 of the platform has two legs 18 (or tabs) that extend from the inside face 12b of the base over its entire length. These legs serve to stiffen the platform so as to avoid it moving in any way under the centrifugal force due to the speed of rotation of the fan.

The platform 10 as constituted in this way presents a π-shaped section, as shown in dashed lines in FIG. 1.

In a variant shown in dotted lines in FIG. 2, the stiffener 14 of the platform may further include a stiffener wall 19 connecting together the legs 18 at their free ends so as to form a closed box under the base 12 of the platform.

Furthermore, in order to provide sealing with the blades positioned on either side of the platform, the platform has gaskets 20 that are assembled on each side margin of its base 12 and that extend between its longitudinal ends.

As shown more precisely in FIG. 2, each gasket 20 has an attachment portion 20a for attaching to the platform and a flexible portion 20b that is to bear against the adjacent blade. Typically, these gaskets 20 are made of an elastomer material.

FIG. 3 is highly diagrammatic, and shows a weft plane of a fiber blank 100 from which a fiber platform preform can be shaped, prior to injecting resin or densifying with a matrix, and possibly followed by machining, in order to obtain the fan platform 10 made of composite material in a first implementation of the invention, and as shown in FIGS. 1 and 2.

The fiber blank 100 has two opposite faces, an outer face 100a and an inner face 100b between which there extend nine layers of warp yarns $c_1$ to $c_9$ and nine layers of weft yarns $t_1$ to $t_9$, with two crossings between the yarns of the group of weft yarns $t_2$ to $t_6$ and the yarns of the group of weft yarns $t_7$ to $t_9$ in two crossing zones 102a and 102b.

Two main zones 104a and 104b of non-interlinking, represented by bold lines in FIG. 3, are provided between the adjacent layers of yarns $c_6$ and $c_7$, these main zones of non-interlinking being open and extending in the side portions of the fiber lank between its side edges 100c and 100d, into which they open out, and the crossing zones 102a and 102b. These main zones 104a, 104b of non-interlinking are defined by the absence of any weft yarns passing through them for the purpose of interlinking warp yarns of the layers of warp yarns situated on either side of the main zones of non-interlinking.

Reference may be made to International patent application WO 2013/088041, which gives a detailed description of using three-dimensional weaving to make such a fiber blank 100 with its main zones 104a, 104b of non-interlinking.

The fiber blank 100 also has two secondary zones 106a, 106b of non-interlinking that are closed and that are likewise represented by bold lines in FIG. 3. These secondary zones 106a, 106b of non-interlinking extend in the side portions of the fiber blank and are provided between the neighboring yarn layers $c_3$ and $c_4$.

The secondary zones 106a, 106b of non-interlinking are said to be "closed" in contrast to the main zones 104a, 104b of non-interlinking that are said to be "open" in the sense that, unlike them, they do not open out into a side edge 100c, 100d of the fiber blank.

As for the main zones of non-interlinking, the secondary zones 106a, 106b of non-interlinking are defined by the absence of any weft yarns passing through them for the purpose of interlinking warp yarns of the layers of warp yarns situated on either side of the secondary zones of non-interlinking.

After the fiber blank 100 has been woven, it is shaped in order to form a fiber preform 200 for a fan platform, such as that shown in FIG. 4.

In particular, the portions 108 and 110 of the fiber blank that are adjacent both to the main zones 104a and 104b of non-interlinking and also to the inside face 100b are deployed so as to form two legs 202 and 204 of the preform 200, with the remainder of the fiber blank forming the base 206 of the preform.

The step of shaping the fiber blank 100 also consists in opening the secondary zones 106a, 106b of non-interlinking. For this purpose, the portion of the fiber blank that is to form the preform of the base 206 (in this example between the yarn layers $c_1$ et $c_6$) is cut away in part in the thickness direction on cutting planes P, P' leading to the insides of said secondary zones of non-interlinking.

More precisely, cutting planes P, P' are previously identified on the fiber blank while it is being woven, e.g. by inserting tracer yarns 112a, 112b (FIG. 3) or any other identifying patterns on the surface of the portion of the fiber blank that is to form the preform of the base, these tracer yarns being positioned in register with the secondary zones 106a, 106b of non-interlinking.

Using a cutter tool, a cut is then made through the thickness of the fiber blank 100 at the tracer yarns from the surface of the portion of the fiber blank that is to form the preform of the base and until reaching the secondary zones 106a, 106b of non-interlinking (with cutting taking place in this example through the layers $c_6$ and $c_4$).

Once the secondary zones 106a, 106b of non-interlinking have been opened, it is possible to insert the gaskets 20 (FIG. 2) therein. More precisely, the attachment portions 20a of the gaskets 20 are positioned inside the secondary zones 106a, 106b of non-interlinking in the fiber preform 200.

The fiber preform 200 together with its gaskets is then placed in an injection mold (not shown the figures) that is closed by a counter-mold prior to injecting liquid resin (e.g. epoxy, bismaleimide, or polyimide resin). The assembly (i.e. the platform preform together with the gaskets) is then compacted inside the injection mold, and then the resin is solidified by heating the mold. After unmolding, the platform is machined to its final dimensions. This produces a fan platform with integrated gaskets.

The injection process that is used herein is itself well known and is therefore not described in detail. In particular, use may be made of a resin transfer molding (RTM) type process.

In the above-described implementation, the numbers of layers of warp yarns and of weft yarns in the various portions of the preform (base and legs) could naturally be different from those in the example shown, providing three-dimensional weaving is performed in each of those portions. Likewise, in this embodiment, warp and weft could be interchanged.

Furthermore, for a platform having a closed box under its base, reference may be made to Document WO 2013/160584, which describes an embodiment of a fiber blank that enables such a platform to be obtained. Creating secondary zones of non-interlinking and opening them in order to insert gaskets as described above applies in identical manner to this type of fiber blank.

Figure 5:
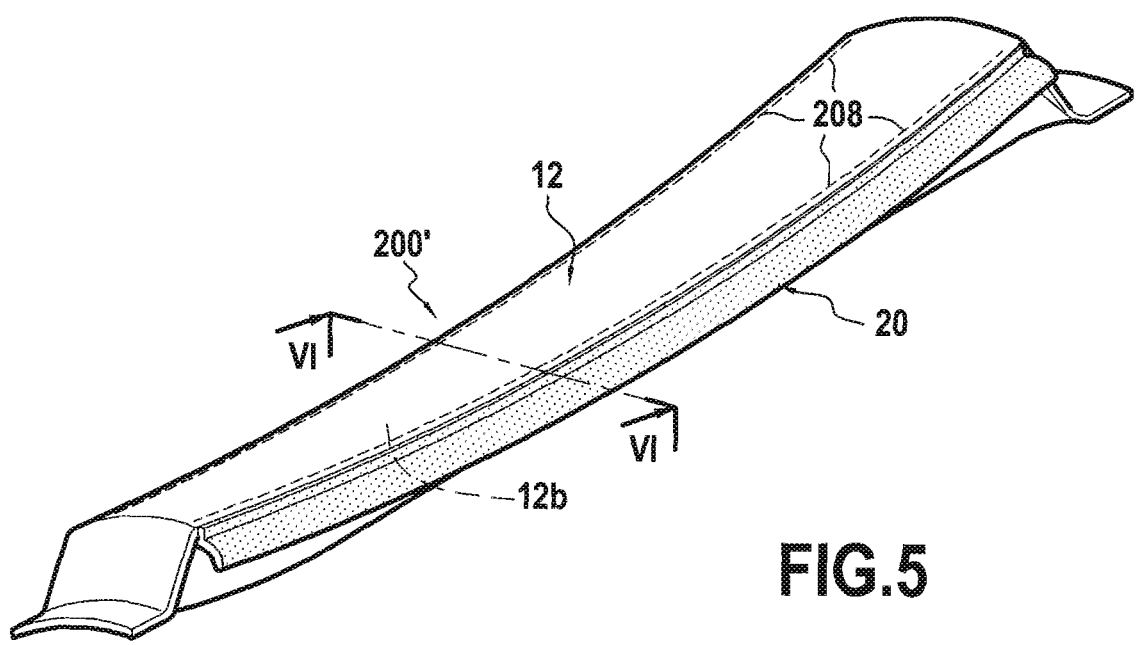
FIGS. 5 and 6 are diagrammatic views of a fan blade platform made of composite material in a second implementation of the invention.
Figure 6:
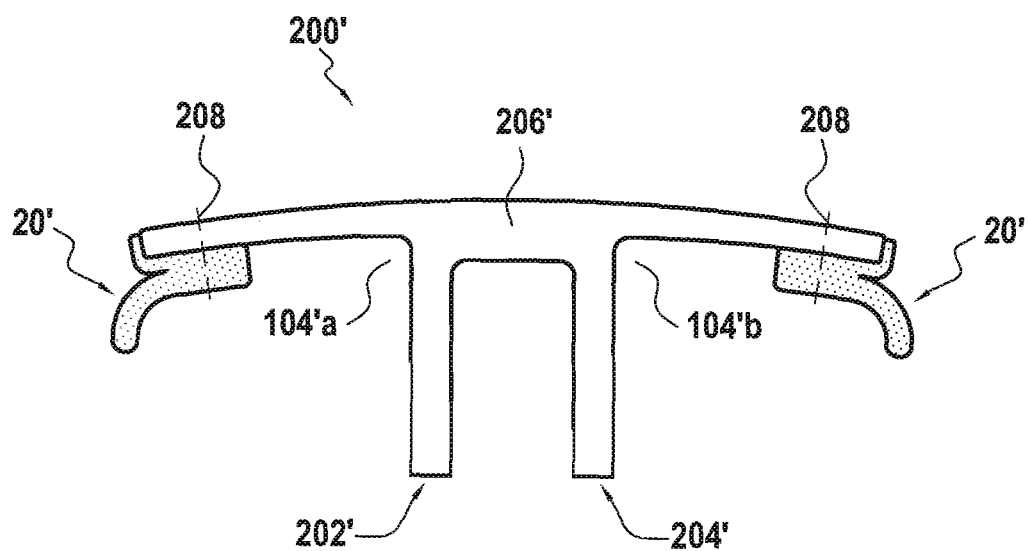

With reference to FIGS. 5 and 6, there follows a description of a second embodiment of the fan platform with integrated gaskets of the invention.

This second embodiment differs from the above-described first embodiment in that the gaskets 20' are mechanically connected to the fiber preform 200' of the platform by stitching.

More precisely, the fan platform with integrated gaskets is obtained from a fiber preform 200' as shown in FIGS. 5 and 6. This fiber preform 200' is obtained from a fiber blank similar to that described with reference to FIG. 3, with the exception of the secondary zones of non-interlinking, which are not present in this example.

The fiber blank is shaped in identical manner to the above-described implementation, in particular by deploying the portions of the blank that are adjacent both to the main zones 104'a, 104'b of non-interlinking and also to the inside face in order to form the two legs 202' and 204' of the preform 200', with the remainder of the fiber blank forming the base 206' of the preform.

At this stage, the gaskets 20' are positioned against the side margins of the preform of the base 206, and then stitched directly to those margins, e.g. by using a plurality of carbon yarns 208 that are longitudinally spaced apart from one another over the entire length of the preform.

Once the gaskets 20' have been assembled, the various steps of the above-described fabrication method are repeated, i.e. the assembly is placed in an injection mold that is closed by a counter-mold prior to injecting resin. The assembly is then compacted inside the injection mold, and then the resin is solidified by heating the mold. After unmolding, the platform is machined to its final dimensions. This produces a fan platform with integrated gaskets.

In a third embodiment of the fan platform with integrated gaskets of the invention (not shown in the figures), provision is made to heat the fiber preform of the platform directly together with its gaskets, without previously mechanically connecting or stitching the gaskets to the fiber preform.

For this purpose, once the fiber preform has been obtained (in a manner identical to that described with reference to the second embodiment), it is placed directly in the injection mold. The gaskets are positioned in the same injection mold against the side margins of the preform of the base, and then the mold is closed by a counter-mold prior to injecting resin. The steps of the fabrication method of the two above implementations are repeated in order to obtain in the end a platform having gaskets fastened thereto, in particular by the solidified resin.

In accordance with a provision that is applicable to all of the implementations of the method of the invention, the composite material fan platform may be of the type that is integrated with a fan blade.

In this variant implementation, the fan blade is made from a fiber preform obtained as a single piece by three-dimensional weaving and having both a portion that forms an airfoil preform and also another portion that forms a platform preform. Reference may be made to document WO 2013/104852, which describes such a fabrication method. It can then be understood that it suffices to apply the teaching of the present invention to making the portion of the fiber preform for the platform preform.

It should also be observed that the elastomer material used for making the gaskets of the platform should be capable of withstanding the temperature that applies while injecting resin into the preform. By way of example, it is possible to use a silicone type elastomer.

The invention claimed is:

1. A method of fabricating a blade platform out of composite material with integrated gaskets for a turbine engine fan, the platform comprising a base extending along a longitudinal direction and presenting two opposite faces and a stiffener that extends from one of the faces of the base, the method comprising:

using three-dimensional weaving to make a single-piece fiber blank with a plurality of longitudinal yarn layers extending in a direction corresponding to a longitudinal direction of the base of the platform and interlinked by yarns of a plurality of transverse yarn layers, while leaving between the longitudinal yarn layers two main zones of non-interlinking that are open, each extending from a side edge of the fiber blank for the purpose of forming a stiffener preform;

shaping the fiber blank to form a fiber preform having a first portion forming a base preform and a second portion forming a stiffener preform;

positioning platform gaskets at side margins of the first portion of the fiber preform forming a base preform;

placing the fiber preform with the gaskets in an injection mold;

injecting resin into the injection mold;

compacting the assembly;

heating the injection mold to solidify the resin; and unmolding the resulting platform, wherein the step of using three-dimensional weaving to make the fiber blank further comprises making closed secondary zones of non-interlinking in the side margins of a portion of the fiber blank that is to form the base preform, the secondary zones of non-interlinking being opened and the gaskets being inserted therein prior to the step of placing the fiber preform in the injection mold.

2. The method according to claim 1, wherein an opening of each secondary zone of non-interlinking comprises cutting the portion of the fiber blank that is to form a base preform in a cutting plane leading to insides of said secondary zones of non-interlinking.

3. The method according to claim 2, wherein the cutting plane is previously identified on the fiber blank.

4. The method according to claim 1, wherein each gasket has an attachment portion that is inserted longitudinally inside a secondary zone of non-interlinking, once opened.

5. A method of fabricating a blade platform out of composite material with integrated gaskets for a turbine engine fan, the platform comprising a base extending along a longitudinal direction and presenting two opposite faces and a stiffener that extends from one of the faces of the base, the method comprising:

using three-dimensional weaving to make a single-piece fiber blank with a plurality of longitudinal yarn layers extending in a direction corresponding to a longitudinal direction of the base of the platform and interlinked by yarns of a plurality of transverse yarn layers, while leaving between the longitudinal yarn layers two main zones of non-interlinking that are open, each extending from a side edge of the fiber blank for the purpose of forming a stiffener preform;

shaping the fiber blank to form a fiber preform having a first portion forming a base preform and a second portion forming a stiffener preform;

positioning platform gaskets at side margins of the first portion of the fiber preform forming a base preform;

placing the fiber preform with the gaskets in an injection mold;

injecting resin into the injection mold;

compacting the assembly;

heating the injection mold to solidify the resin; and unmolding the resulting platform, wherein the gaskets are assembled to the side margins of the first portion of the fiber preform forming a base preform by stitching prior to the step of placing the fiber preform in the injection mold.

6. The method according to claim 5, wherein carbon yarns are used for assembling the gaskets to the side edges of the first portion of the fiber preform forming a base preform.

7. A method of fabricating a blade platform out of composite material with integrated gaskets for a turbine engine fan, the platform comprising a base extending along a longitudinal direction and presenting two opposite faces and a stiffener that extends from one of the faces of the base, the method comprising:

using three-dimensional weaving to make a single-piece fiber blank with a plurality of longitudinal yarn layers extending in a direction corresponding to a longitudinal direction of the base of the platform and interlinked by yarns of a plurality of transverse yarn layers, while leaving between the longitudinal yarn layers two main zones of non-interlinking that are open, each extending from a side edge of the fiber blank for the purpose of forming a stiffener preform;

shaping the fiber blank to form a fiber preform having a first portion forming a base preform and a second portion forming a stiffener preform;

positioning platform gaskets at side margins of the first portion of the fiber preform forming a base preform;

placing the fiber preform with the gaskets in an injection mold;

injecting resin into the injection mold;

compacting the assembly;

heating the injection mold to solidify the resin; and unmolding the resulting platform, wherein the gaskets are placed in the injection mold against the side margins of the first portion of the fiber preform forming the base preform without being mechanically connected thereto, and wherein each longitudinal end of the base of the platform is folded inward so as to present a step, and the gaskets extend between the steps in the longitudinal direction.

8. The method according to claim 1, wherein the gaskets are made of elastomer.

9. The method according to claim 1, wherein the stiffener of the preform comprises two legs.

10. The method according to claim 9, wherein the stiffener of the platform further includes a stiffener wall connecting together free ends of the legs.

11. The method according to claim 1, wherein each gasket includes an attachment portion which is attached to the platform, and a flexible portion configured to abut against a blade.

* * * * *